E. E. WERNER.
APPARATUS FOR INDICATING THE VOLUMETRIC FLOW OF A GAS.
APPLICATION FILED APR. 19, 1915.
1,195,631.
Patented Aug. 22, 1916.
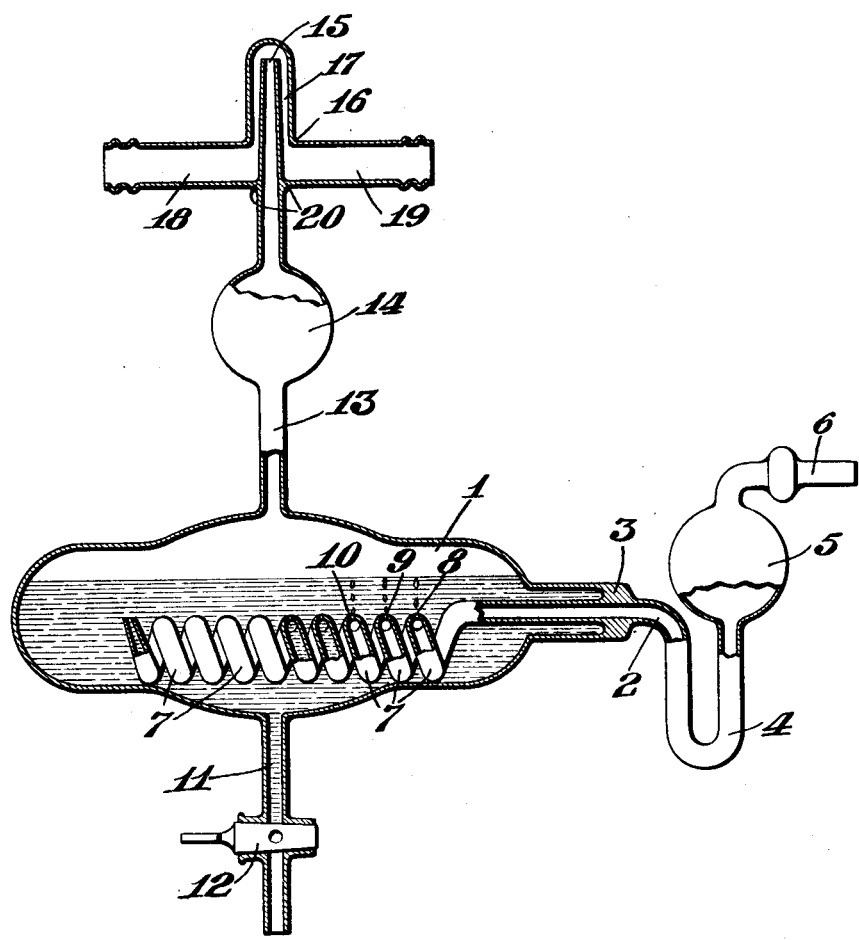
Witnesses:
G. A. Pennington
Stella Hill.
Inventor:
Ernest E. Werner,
By Bruce S. Elliott,
his Atty.

UNITED STATES PATENT OFFICE.

ERNEST E. WERNER, OF INDIANAPOLIS, INDIANA.

APPARATUS FOR INDICATING THE VOLUMETRIC FLOW OF A GAS.

,195,631.   Specification of Letters Patent.   Patented Aug. 22, 1916.

Application filed April 19, 1915. Serial No. 22,233.

*To all whom it may concern:*

Be it known that I, ERNEST E. WERNER, a citizen of the United States, residing in Indianapolis, in the county of Marion and State of Indiana, have invented new and useful Improvements in Apparatus for Indicating the Volumetric Flow of a Gas, of which the following is a specification.

This invention has for its primary object the provision of a novel apparatus for indicating the quantitative discharge of a gas in order to enable the flow thereof to be properly regulated.

The invention, while not limited in its application, is designed especially for regulating the flow of a gas to be used for the so-called "bleaching" of flour, in the use of that type of apparatus in which the bleaching medium is furnished by the volatilization of a liquefied gas.

As now practised, a tank containing a liquefied gas, or gaseous compound, is supplied to the miller, who connects it to the bleaching apparatus and by means of valve mechanism on the tank regulates, as best he can, the flow of the gas therefrom. The rapidity with which the gas volatilizes in the tank is governed to a large extent by temperature, and it has been found that owing to sudden changes of temperature frequently too much or too little of the gas is supplied to the flour. Furthermore, even when the temperature is maintained uniform, the gas employed, usually chlorin or some mixture involving the use of chlorin, rapidly corrodes the regulating valve, so that unless the working of the apparatus is closely watched there is likely to be a very material variation in the course of a relatively short time in the supply of the bleaching gas to the flour.

My invention aims to provide a ready and easily-observable means of detecting any increase or decrease in the flow of the gas, so that by adjusting the valve on the container or tank the normal flow of the gas may be restored.

With the above objects and purposes in view, my invention consists in indicating the volumetric flow of the gas, by causing the gas to displace a volume of liquid in a submerged coiled tube, which is horizontally disposed, and each coil of which is provided at its top with an aperture, so that according to the rate of volatilization of the liquid gas and the consequent degree of pressure of the gas passing into the tube, one or more of said apertures will be made accessible for the escape of the gas by displacement of the water in the tube, the greater the pressure of the gas the greater the displacement of the water and the greater the number of apertures made accessible to the gas. The gas escaping through the apertures bubbles up through the liquid in which the perforated tube is submerged, after which it is diluted with air in any convenient way and conveyed to the flour. The liquid in which the perforated tube is submerged is preferably one that will not absorb the gas being used, or combine with any element of it, so as to vary its condition or change its character; and with this object in view, when chlorin gas is used I prefer to employ a saline solution as the medium through which the escaping gas bubbles.

In an application for a method of indicating the flow of a gas, filed by me November 30th, 1914, serially numbered 874,617, I show for the practice of my method a downwardly-inclined tube submerged in a body of liquid and provided with a row of perforations in its upper side. The device referred to in actual commercial use has operated in a highly satisfactory manner, and, so far as I am aware, is the only practical device devised for accomplishing the purposes above referred to. It approximates an ideal means for enabling the volumetric flow of a gas to be ascertained and regulated. It possesses one disadvantage, however, which while not so marked as to seriously militate against its use, it is, nevertheless, desirable to overcome. This disadvantage resides in the fact that owing to the incline of the tube the escape of the gas from the apertures is opposed by a constantly-increasing counter-pressure of liquid as each succeeding aperture is uncovered, due to the increasing height of the liquid in the direction of the lower end of the tube. Thus, with the first aperture uncovered a definite amount of the gas will, of course, escape through the aperture. When, however, the pressure of the gas is sufficient to uncover two apertures the amount of gas escaping from the second aperture will not be the same as that escaping from the first aperture, as the escape of gas from the second aperture is opposed by a greater pressure of the surrounding liquid. At the same time, the increased pressure of the gas necessary to uncover the second aperture will cause a greater amount of gas to escape from the first aperture. The same conditions obtain relatively as each succeeding aperture is uncovered by the displacement of the liquid in the tube, and it is impossible for the pressure of the gas to equalize so as to discharge uniformly from all of the apertures uncovered.

By the use of the present apparatus the objections incident to the use of my prior device referred to are overcome, in that as soon as a plurality of openings is uncovered the pressure of the gas will equalize and the gas will discharge in uniform quantities from all of such apertures. Thus, with the knowledge of the volumetric discharge of the gas through one aperture, the observer is enabled to determine the volumetric discharge from two, three, or more apertures by the process of multiplication, and does not have to take into consideration any question of variations in pressure at the different apertures, the factors governing the discharge of the gas being uniform throughout.

In the accompanying drawing the view illustrates my improved apparatus in broken sectional elevation.

The apparatus is shown as a unitary device, and as made of glass. It will be understood, however, that this particular construction is not essential, but the various members of the apparatus may be constructed separately and connected by suitable joints in any well-known or preferred manner.

Referring now to the drawing, the numeral 1 indicates a vessel which has entering it at one end a tube 2, said tube being hermetically sealed at the point of entrance into the vessel 1 in any suitable manner, the drawing showing the tube as being integral with the vessel 1, as indicated at 3. The tube 2 is preferably bent to form a trap 4, and connects with a reflux bulb 5, to the top of which is connected a tube 6, to which is designed to be attached a pipe leading to a cylinder, the flow of gas from which is to be regulated. The tube 2 projects a short distance within the vessel 1, and thence is continued in the form of a coiled-tube partway across the length of the vessel 1, the said tube being horizontally disposed and of uniform dimensions throughout, and each of its coils 7 being provided at its top with an aperture, said apertures being indicated, in order, by the numerals 8, 9, 10, etc.

Communicating with the vessel 1, and preferably extending from the bottom thereof, is a tube 11 which is provided with a stop-cock 12, and through this tube the vessel 1 is provided with a liquid, preferably a saline solution, in sufficient quantity to entirely cover the coils 7, and to extend for some distance above these coils so that the passage through the liquid of the gas escaping from the apertures 8, 9, 10, etc., may be readily observed. Communicating with the vessel 1 and projecting preferably from the top thereof, is a tube 13 having interposed in its length a reservoir bulb 14, the tube 13 continuing above the bulb 14, and having its upper end open, as indicated at 15, to provide an outlet for the discharge of gas.

The numeral 16 indicates, generally, a mixing chamber which comprises a hood 17 surrounding the discharge opening 15 and the upper portion of the tube 13, and tubes 18, 19, respectively, projecting from opposite sides of the hood 17 and being sealed about the tube 13, as indicated at 20. The tube 18 is designed to be connected with a suitable source of air supply, and the tube 19 with an apparatus, such as an agitator, in the case of bleaching flour, to which the mixed air and gas is to be supplied.

In operation, gas under pressure enters through the tube 6 from a suitable tank or reservoir containing the gas and passing through the reservoir 5 and trap 4 enters the tube 2 where its further progress is opposed by the liquid in said tube. With a sufficient pressure of gas the liquid is displaced in said tube, being forced out of the apertures 8, 9, etc., and through the open end of the tube. This continues until the aperture 8 in the first coil is uncovered, that is, rendered accessible to the passage of gas therethrough by the displacement of the liquid in its coil, when the gas will escape through said aperture and bubble up through the liquid in the vessel 1. Should the pressure of the gas be great enough the liquid will be forced out of the second coil and the aperture 9 will be uncovered and the gas escape through said aperture. While momentarily there will be an increase of pressure in the first coil until the aperture 9 in the second coil is uncovered, as soon as this latter event occurs the pressures of the gas will at once equalize, and the gas will escape in uniform volumes through the two apertures 8 and 9. The same rule applies as to succeeding coils and apertures; and as the apertures are uniform in size, the observer is able to determine with a high degree of accuracy the amount of gas being discharged according to the number of apertures uncovered, the latter, of course, being evidenced by the rows of bubbles passing up through the liquid in the vessel 1. It will be readily apparent that the volume of liquid in the tube 2 in the portion thereof extending between the apertures of two adjacent coils is uniform throughout the length of the tube, and as the tube 2 is horizontally disposed, the counter-pressure of the liquid is constant at all stages of operation so that the degree of displacement of the liquid in the coils 7 bears an exact proportion to the degree of pressure of the gas exerted upon said liquid. The only variable factor is the slight increase of the pressure of gas in the preceding coil or coils until the aperture in a succeeding coil is uncovered, but, as will be apparent, this is only momentary. The degree of pressure necessary to displace the liquid in the tube is relatively slight, especially as to the first two or three coils, so that the device is quite delicate in operation and responds readily to any variations in pressure of the gas.

As the gas bubbles up through the liquid in the vessel 1 it passes into the tube 13 and the reservoir bulb 14 and thence is discharged through the outlet 15 into the hood 17, and passing downward is met by and mixed with the air entering through the tube 18, and the mixed air and gas passes from the tube 19 through a suitable conduit to the place of application.

In the event that the liquid in the vessel 1 is such as will absorb the gas employed, it is desirable to provide the reflux bulb 5, as otherwise when the flow of gas through the tube 6 has been shut off the gas then in the apparatus will be absorbed by the liquid, tending to produce a vacuum in the tubes 2 and 6, and if a continuous tube were employed the liquid would be drawn up in such tube and would corrode the joints. With the present apparatus, should this occur the bulb 5 is of sufficient capacity to contain the liquid which would thus be sucked back and thus will prevent it from coming in contact with the joints in the tube 6.

The reservoir bulb 14 is simply for the purpose of collecting any drops of moisture which might be carried up by the gas passing through the tube 13.

I claim:

1. An apparatus for indicating the volumetric flow of a gas comprising a container having a liquid therein, and through which said liquid is visible, and provided with an outlet for gas, and a conduit submerged in said liquid at an angle to the vertical and adapted to communicate with a source of gas under pressure and having apertures located at laterally separated points.

2. An apparatus for indicating the volumetric flow of a gas comprising a container having a liquid therein, and through which said liquid is visible, and provided with an outlet for gas, and a conduit submerged in said liquid at an angle to the vertical and adapted to communicate with a source of gas under pressure and having a row of apertures in its upper side.

3. An apparatus for indicating the volumetric flow of a gas comprising a container having a liquid therein, and through which said liquid is visible, and provided with an outlet for gas, and a horizontally-disposed conduit submerged in the liquid of said container and adapted to communicate with a source of gas under pressure, and having a line of apertures extending lengthwise thereof.

4. An apparatus for indicating the volumetric flow of a gas comprising a submerged conduit adapted to communicate with a source of gas under pressure and presenting a symmetrical tortuous passage, each bend whereof is provided with an aperture.

5. An apparatus for indicating the volumetric flow of a gas comprising a submerged horizontally-disposed conduit adapted to communicate with a source of gas under pressure and presenting a symmetrical tortuous passage, each bend whereof is provided with an aperture.

6. An apparatus for indicating the volumetric flow of a gas comprising a submerged horizontally-disposed conduit adapted to communicate with a source of gas under pressure and presenting a symmetrical tortuous passage, each bend whereof is provided in its vertex with an aperture.

7. An apparatus for indicating the volumetric flow of a gas comprising a submerged conduit adapted to communicate with a source of gas under pressure and having coils, each of which is provided with an aperture.

8. An apparatus for indicating the volumetric flow of a gas comprising a submerged coiled tube adapted to communicate with a source of gas under pressure, said tube being horizontally-disposed and each of its coils having an aperture in its top.

In testimony whereof, I have hereunto set my hand.

ERNEST E. WERNER.